United States Patent
Lai et al.

(10) Patent No.: US 8,032,988 B2
(45) Date of Patent: Oct. 11, 2011

(54) ROTATING MECHANISM AND ELECTRONIC DEVICE USING THE SAME

(75) Inventors: Chin-Chung Lai, Taipei (TW); Hung-Chang Hung, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 550 days.

(21) Appl. No.: 12/149,302

(22) Filed: Apr. 30, 2008

(65) Prior Publication Data

US 2008/0284295 A1 Nov. 20, 2008

(30) Foreign Application Priority Data

Apr. 30, 2007 (TW) .............................. 96115410 A

(51) Int. Cl.
*E05D 7/00* (2006.01)
(52) U.S. Cl. ................. 16/354; 16/366; 16/54
(58) Field of Classification Search .................... 16/354, 16/366, 54; 49/382, 383; 160/229.1, 231.2, 160/232, 236; 455/575.1–575.4, 90.3, 90.1; 379/433.13, 433.12; 361/679.06, 679.12, 361/679.27
See application file for complete search history.

(56) References Cited

U.S. PATENT DOCUMENTS

| 1,167,906 | A | * | 1/1916 | Compte | 296/92 |
|---|---|---|---|---|---|
| 4,916,926 | A | * | 4/1990 | Shieh | 70/135 |
| 5,363,089 | A | * | 11/1994 | Goldenberg | 340/7.63 |
| 5,966,777 | A | * | 10/1999 | Jantschek | 16/354 |
| 5,987,704 | A | * | 11/1999 | Tang | 16/354 |
| 6,519,812 | B2 | * | 2/2003 | Ko et al. | 16/354 |
| 6,574,837 | B2 | * | 6/2003 | Jantschek | 16/371 |
| 6,765,027 | B2 | * | 7/2004 | Holdcroft et al. | 521/27 |
| 7,043,797 | B2 | * | 5/2006 | Cau | 16/285 |
| 7,483,723 | B2 | * | 1/2009 | Soderlund | 455/575.1 |
| 2004/0212956 | A1 | * | 10/2004 | Kuivas et al. | 361/683 |
| 2005/0050686 | A1 | * | 3/2005 | Kurokawa | 16/354 |
| 2005/0122671 | A1 | * | 6/2005 | Homer | 361/681 |

FOREIGN PATENT DOCUMENTS

| CN | 101098602 | 1/2008 |
|---|---|---|
| TW | 1264925 | 10/2006 |

* cited by examiner

*Primary Examiner* — Chuck Y. Mah

(57) ABSTRACT

A rotating mechanism and an electronic device using the same are provided. The rotating mechanism is disposed at the electronic device. The electronic device includes a first casing and a second casing. The rotating mechanism includes a first gear and a second gear. The first gear is coupled to the first casing. The second gear is coupled to the second casing. The second gear is engaged with the first gear, and then the first casing is capable of rotating relatively to the second casing.

11 Claims, 5 Drawing Sheets

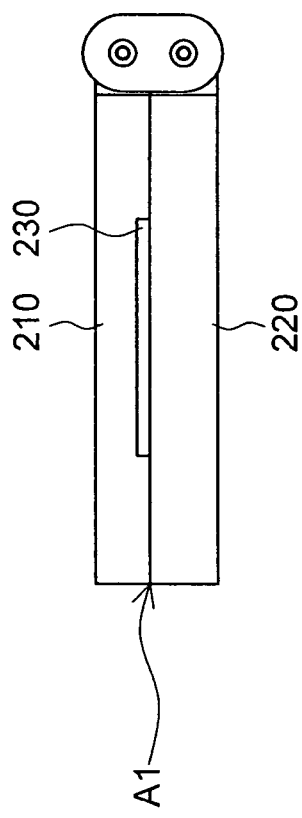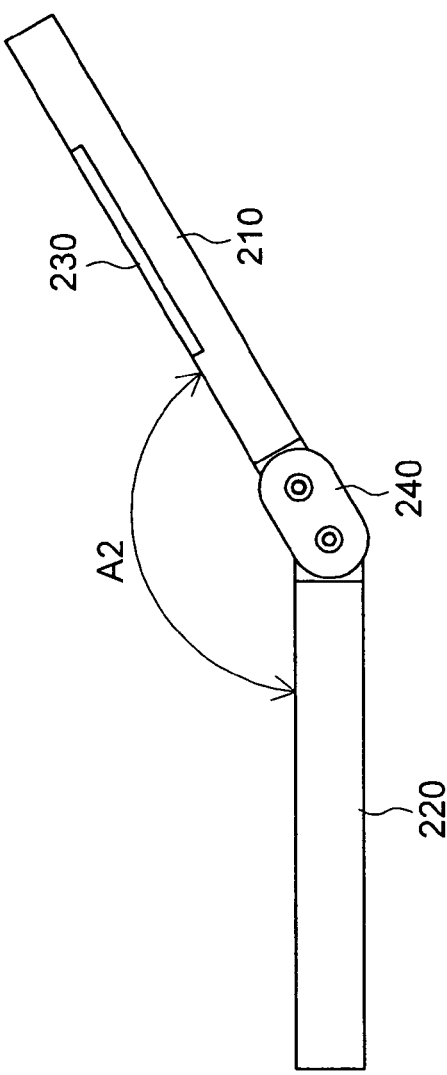

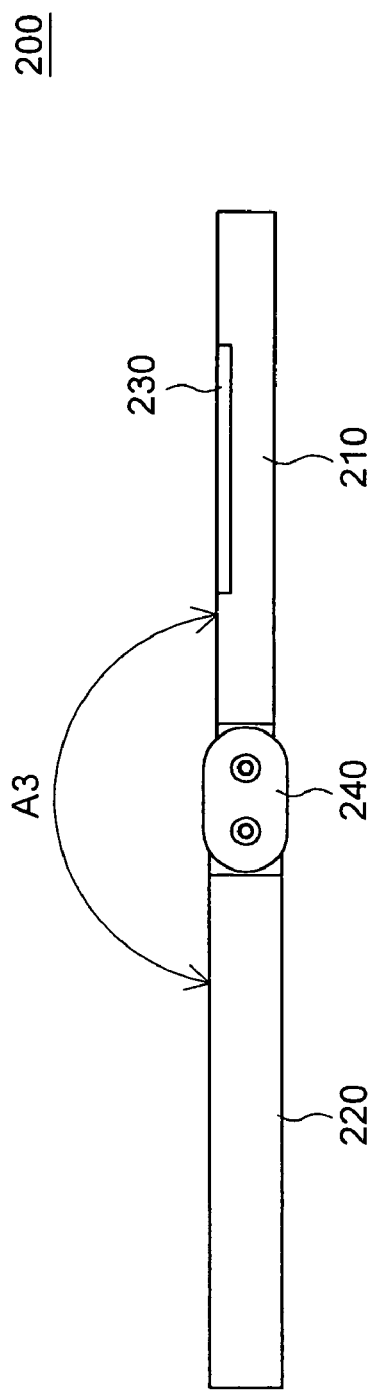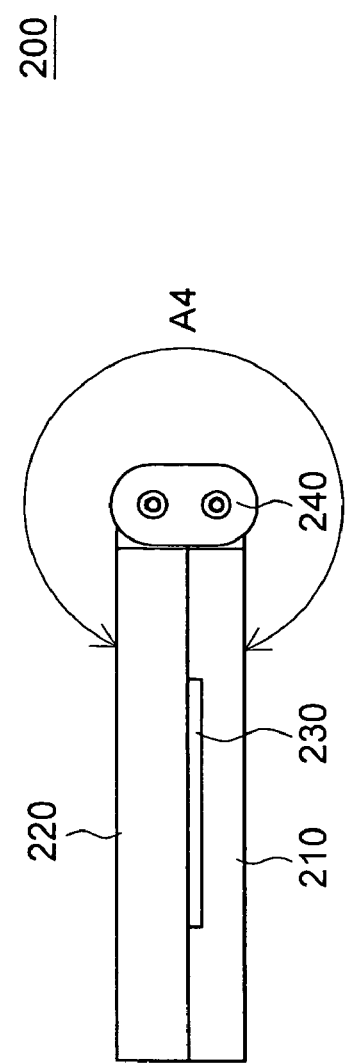
FIG. 4C
FIG. 4D

ROTATING MECHANISM AND ELECTRONIC DEVICE USING THE SAME

BACKGROUND OF THE INVENTION

This application claims the benefit of Taiwan application Serial No. 96115410, filed Apr. 30, 2007, the subject matter of which is incorporated herein by reference.

FIELD OF THE INVENTION

The invention relates to a rotating mechanism and, more particularly, to an electronic device using the rotating mechanism.

DESCRIPTION OF THE RELATED ART

The kinds of the conventional information appliance (IA) are various, and the IA is used widely. Taking the notebook as an example, a common notebook includes a display panel and a host, and the display panel and the host may be open or closed.

FIG. 1A is a schematic diagram showing a conventional notebook. The notebook 100 has a first casing 101, a second casing 102, a screen 120 and two rotating shafts 130. The screen 120 is disposed at the first casing 101. The first casing 101 and the second casing 102 are coupled to the rotating shaft 130, respectively. Thus, the first casing 101 is capable of rotating relatively to the second casing 102.

However, because of the design of the rotating shaft 130, the angle θ1 by which the first casing 101 rotates relatively to the second casing 102 is often limited. Therefore, the user cannot adjust the angle θ1 of the first casing 101 at any angle. In addition, FIG. 1B is a lateral diagram showing the notebook shown in FIG. 1A. Generally speaking, when the first casing 101 rotates relatively to the second casing 102 by 180 degrees, a height difference H1 is formed between the first casing 101 and a plane 103. It may be inconvenient for the user as a result of the height difference.

BRIEF SUMMARY OF THE INVENTION

The invention relates to a rotating mechanism and an electronic device using the same. For the rotating mechanism, the first gear and the second gear are disposed at the first casing and the second casing, respectively. Thus, the first casing is capable of rotating by any angle relatively to the second casing.

According to one aspect of the invention, a rotating mechanism is disclosed. The rotating mechanism is used to be installed in an electronic device. The electronic device includes a first casing and a second casing. The rotating mechanism includes a first gear and a second gear. The first gear is coupled to the first casing. The second gear is coupled to the second casing. The second gear is engaged with first gear to rotate the first casing relatively to the second casing.

According to another aspect of the invention, an electronic device is provided. The electronic device includes a first casing, a second casing and a rotating mechanism. The rotating mechanism includes a first gear and a second gear. The first gear is coupled to the first casing. The second gear is coupled to the second casing. The second gear is engaged with the first gear to rotate the first casing relatively to the second casing by any angle.

These and other features, aspects, and advantages of the present invention will become better understood with regard to the following description, appended claims, and accompanying drawings.

BRIEF DESCRIPTION OF THE DRAWINGS

FIG. 4A to FIG. 4D are schematic diagrams showing that the first casing of the electronic device in FIG. 2 rotates relatively to the second casing.

DETAILED DESCRIPTION OF THE EMBODIMENTS

Figure 1A:
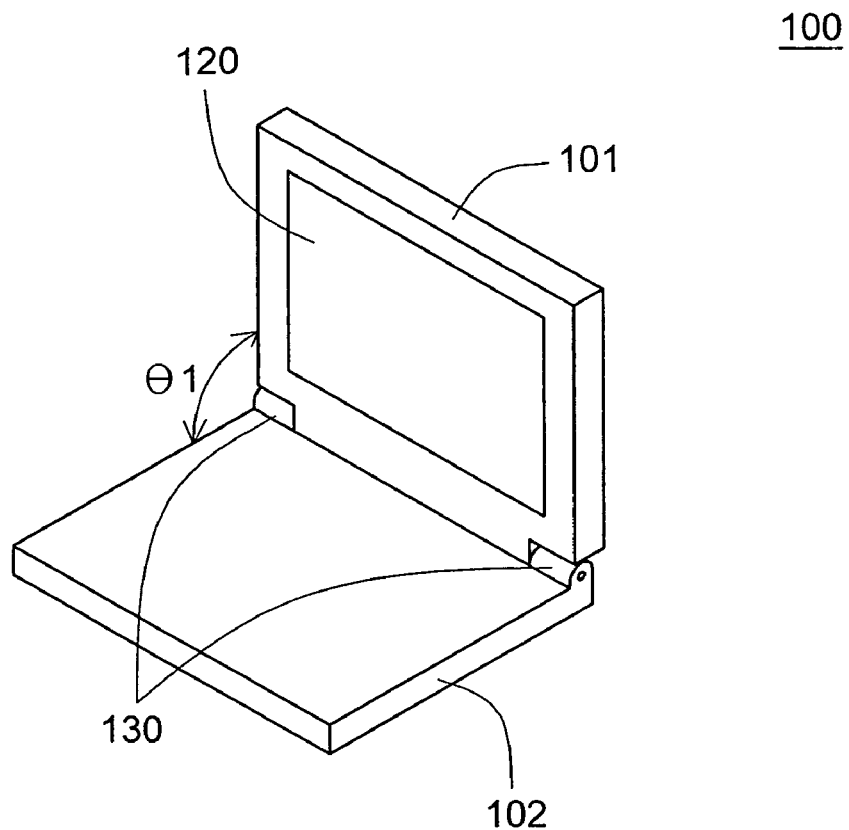
FIG. 1A is a schematic diagram showing a conventional notebook.
Figure 1B:
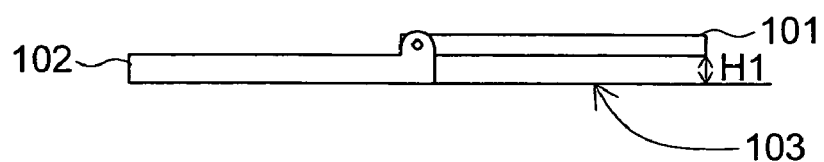
FIG. 1B is a lateral diagram showing the notebook in FIG. 1A.
Figure 2:
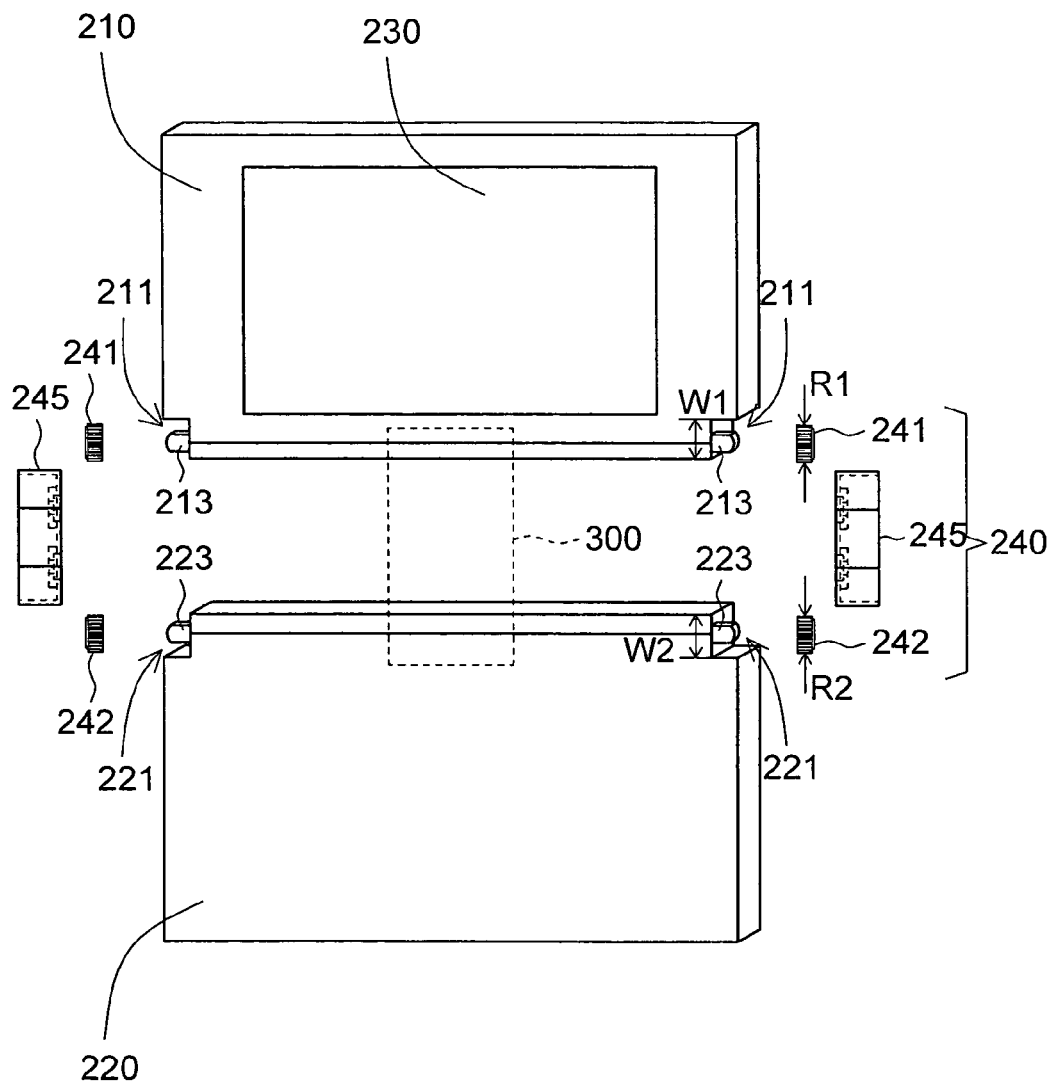
FIG. 2 is a schematic diagram showing an electronic device according to a preferred embodiment of the invention.

FIG. 2 is a schematic diagram showing an electronic device according to a preferred embodiment of the invention. The electronic device 200 may be an IA with any form such as a notebook, a mobile phone, a smart phone, a personal digital assistance (PDA), a PDA phone and so on. In the embodiment, the electronic device 200 is, for example, a notebook.

The electronic device 200 includes a first casing 210, a second casing 220, a screen 230 and a rotating mechanism 240. Since the electronic device 200 is a notebook in the embodiment, the first casing 210 and the second casing 220 are two casings of the notebook in the embodiment.

In the embodiment, the screen 230 is disposed at the first casing 210. The first casing 210 has two first notches 211 and two first protrudent posts 213. The second casing 220 has two second notches 221 and two second protrudent posts 223. The first notches 211 and the second notches 221 are disposed at the end corners of the first casing 210 and the second casing 220, respectively. The first protrudent posts 213 and the second protrudent posts 223 are disposed at the first notches 211 and the second notches 221, respectively.

In the embodiment, the position and number of the first notches 211, the second notches 221, the first protrudent posts 213 and the second protrudent posts 223 are not limited. These elements also may be disposed at the range 300 which is circled in FIG. 2. That is, just one first notch 211 and one second notch 211 may be disposed at the first casing 210 and the second casing 220, respectively.

The rotating mechanism 240 includes two first gears 241, two second gears 242 and two securing covers 245. The first gears 241 are coupled to the first protrudent posts 213 of the first casing 210. The second gears 242 are coupled to the second protrudent posts 223 of the second casing 220. The second gears 242 and the first gears 241 are in mesh to rotate the first casing 210 relatively to the second casing 220 by zero degrees to 360 degrees. The second casing 220 in the embodiment also may rotate relatively to the first casing 210 according to the need of users.

In the embodiment, the tooth number of the first gear 241 is the same with the tooth number of the second gear 242. Thus, the number of turns of the first gear 241 corresponds to the number of turns of the second gear 242. In addition, the tooth portion of the first gear 241 is protrudent from the outer edge of the first casing 210, and the tooth portion of the second gear 242 is protrudent from the outer edge of the second casing 220.

Figure 3:
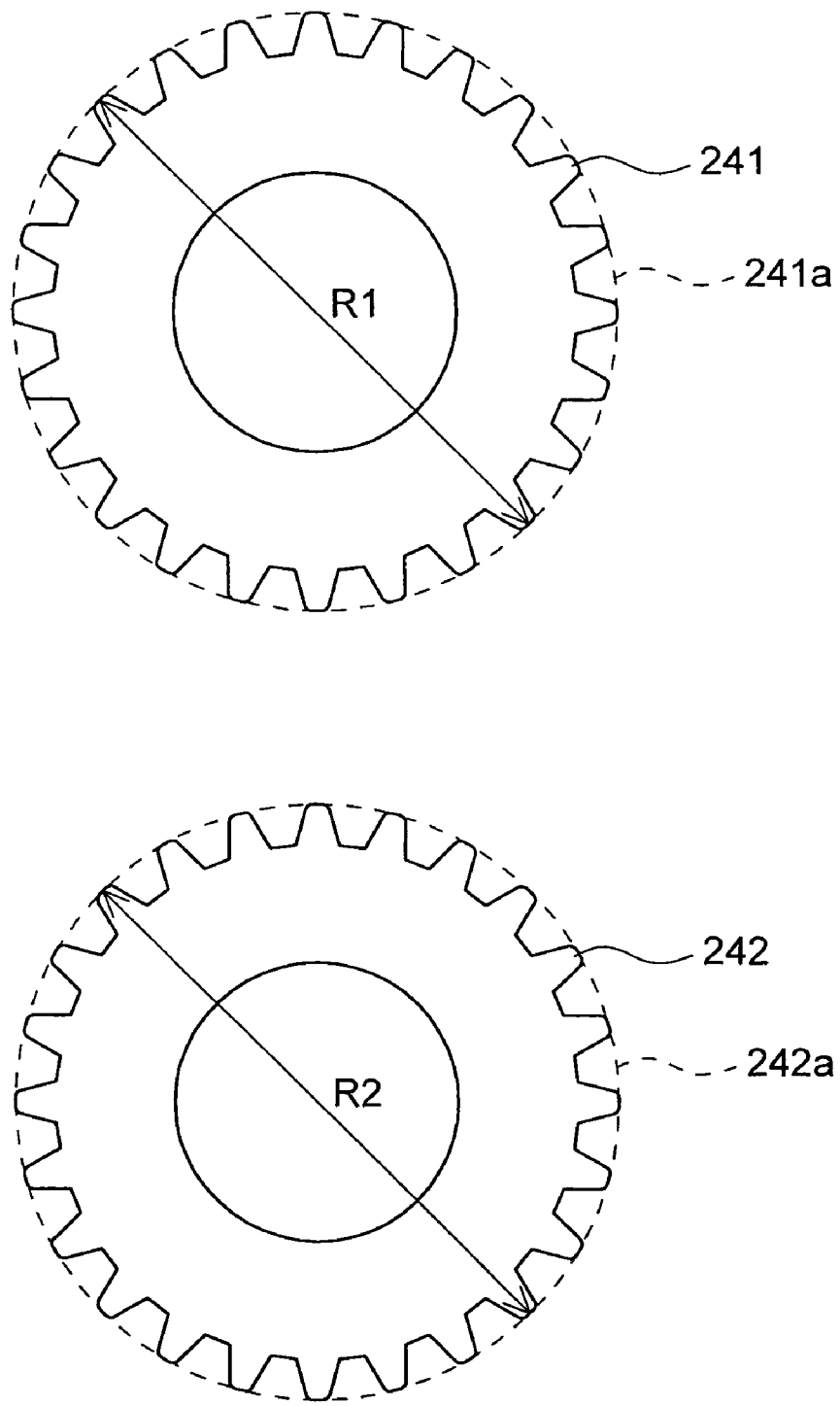
FIG. 3 is a schematic diagram showing the first gear and the a second gear in FIG. 2.

Refer to FIG. 2 and FIG. 3 at the same time. FIG. 3 is a schematic diagram showing the first gear and the second gear shown in FIG. 2. The diameter R1 of the addendum circle 241a of the first gear 241 is greater than the width W1 of the first notch 211. The diameter R2 of the addendum circle 242a of the second gear 242 is greater than the width W2 of the second notch 221. Thus, the first gear 241 and second gear 242 may be in mesh.

As shown in FIG. 2, the rotating mechanism 240 of the embodiment includes two first gears 241 and two second gears 242. The first gear 241 is disposed at the first protrudent post 213, and the second gear 242 is disposed at the second protrudent post 223. Therefore, the number of the first gears 241 should correspond to the number of the first protrudent posts 213, and number of the second gears 242 should correspond to the number of the second protrudent posts 223.

The securing cover 245 is used to hold the first gear 241 and the second gear 242 to connect the first casing 210 and the second casing 220. The first gear 241 and the second gear 242 may rotate in the securing cover 245. In the embodiment, the securing cover 245 also may prevent users from touching the first gear 241 and the second gear 242.

The damping oil (not shown) may be disposed between the tooth portion of the first gear 241 and the tooth portion of the second gear 242 to provide friction. Thus, the angle by which the first casing 210 rotates relatively to the second casing 220 is maintained. However, the first casing 210 also may be positioned in other manner in the embodiment of the invention.

FIG. 4A to FIG. 4D are schematic diagrams showing that the first casing of the electronic device in FIG. 2 rotates relatively to the second casing. As shown in FIG. 4A, the surface having the screen 230 of the electronic device 200 is between the first casing 210 and the second casing 220. In other words, the first angle A1 between the first casing 210 and the second casing 220 is zero degrees.

As shown in FIG. 4B, the first casing 210 of the electronic device 200 rotates by a second angle A2 via the rotating mechanism 240 to allow users to watch the screen 230 and input data.

As shown in FIG. 4C, the first casing 210 of the electronic device also rotates by a third angle A3 via the rotating mechanism 240. The third angle A3 is 180 degrees. In this way, the screen 230 may lie, and no height difference is formed between the first casing 210 and the table top.

As shown in FIG. 4D, the first casing 210 of the electronic device 200 rotates by a fourth angle A4 relatively to the second casing 220 via the rotating mechanism 240. The fourth angle A4 is 360 degrees. To sum up, the electronic device 200 of the embodiment uses the rotating mechanism 240 to rotate the first casing 210 by a random angle relatively to the second casing 220.

The rotating mechanism and the electronic device using the same of the embodiment of the invention allow the first casing to rotate relatively to the second casing. The disposition manner of the first gear and the second gear of the rotating mechanism allows the first casing to rotate relatively to the second casing by zero degrees to 360 degrees. However, it is not limited to be capable of rotating by zero degrees to 360 degrees, and the rotating angle may be designed according to the need. In other words, the first casing is capable of being rotated by and positioned at any angle according to the user's need.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A rotating mechanism to rotate a first casing relatively to a second casing, the rotating mechanism comprising:
   a first gear coupled to the first casing;
   a second gear coupled to the second casing and engaged with the first gear to rotate the first casing relatively to the second casing;
   a securing cover for covering the first gear and the second gear, wherein the first gear and the second gear rotate in the securing cover; and
   damping oil disposed at the tooth portions of the first bear and the second bear to provide friction to allow the first casing to maintain the angle by which the first casing rotates relatively to the second casing.

2. The rotating mechanism according to claim 1, wherein the first casing is capable of rotating by zero degree to 360 degrees relatively to the second casing.

3. The rotating mechanism according to claim 1, wherein the tooth number of the first gear is the same with the tooth number of the second gear.

4. The rotating mechanism according to claim 1, wherein the tooth portion of the first gear is protrudent from the first casing, and the tooth portion of the second gear is protrudent from the second casing.

5. An electronic device comprising:
   a first casing;
   a second casing; and
   a rotating mechanism comprising:
      a first gear coupled to the first casing;
      a second gear coupled to the second casing and engaged with the first gear to rotate the first casing relatively to the second casing;
      a securing cover for covering the first gear and the second gear, wherein the first gear and the second gear rotate in the securing cover; and
   damping oil disposed at the tooth portions of the first gear and the second gear to provide friction to allow the first casing to maintain the angle by which the first casing rotates relatively to the second casing.

6. The electronic device according to claim 5, wherein the first casing is capable of rotating by zero degrees to 360 degrees relatively to the second casing.

7. The electronic device according to claim 5, wherein the tooth number of the first gear is the same with the tooth number of the second gear.

8. The electronic device according to claim 5, wherein the first casing has a first protrudent post, the second casing has a second protrudent post, the first gear is coupled to the first protrudent post, and the second gear is coupled to the second protrudent post.

9. The electronic device according to claim 8, wherein the first casing and the second casing have a first notch and a second notch, respectively, the first protrudent post is disposed at the first notch, and the second protrudent post is disposed at the second notch.

10. The electronic device according to claim 9, wherein the first notch is disposed at the end corner of the first casing, and the second notch is disposed at the end corner of the second casing.

11. The electronic device according to claim 5, wherein the tooth portion of the first gear is protrudent from the first casing, and the tooth portion of the second gear is protrudent from the second casing.

* * * * *